United States Patent
Banuelos

(10) Patent No.: US 11,371,203 B2
(45) Date of Patent: Jun. 28, 2022

(54) DEVICES FOR CONTROLLING EROSION AND STORM WATER RUNOFF

(71) Applicant: Juan Banuelos, Arcadia, CA (US)

(72) Inventor: Juan Banuelos, Arcadia, CA (US)

( * ) Notice: Subject to any disclaimer, the term of this patent is extended or adjusted under 35 U.S.C. 154(b) by 0 days.

(21) Appl. No.: 17/117,060

(22) Filed: Dec. 9, 2020

(65) Prior Publication Data

US 2021/0087772 A1 Mar. 25, 2021

Related U.S. Application Data

(62) Division of application No. 16/127,070, filed on Sep. 10, 2018, now Pat. No. 10,941,535.

(Continued)

(51) Int. Cl.
| | |
|---|---|
| *E02D 17/20* | (2006.01) |
| *B01D 15/00* | (2006.01) |
| *C02F 1/28* | (2006.01) |
| *B32B 9/00* | (2006.01) |
| *B32B 9/04* | (2006.01) |
| *B32B 5/02* | (2006.01) |
| *E03F 1/00* | (2006.01) |
| *E02B 11/00* | (2006.01) |
| *E03F 5/04* | (2006.01) |
| *E03F 5/046* | (2006.01) |

(Continued)

(52) U.S. Cl.
CPC .............. *E02D 17/20* (2013.01); *B01D 15/00* (2013.01); *B32B 5/028* (2013.01); *B32B 9/007* (2013.01); *B32B 9/047* (2013.01); *C02F 1/283* (2013.01); *E02B 11/00* (2013.01); *E03F 1/00* (2013.01); *E03F 5/0403* (2013.01); *E03F 5/0404* (2013.01); *E03F 5/046* (2013.01); *B32B 2307/724* (2013.01); *C02F 2101/20* (2013.01); *C02F 2101/306* (2013.01); *C02F 2101/32* (2013.01); *C02F 2103/001* (2013.01); *E02D 2300/00* (2013.01); *E02D 2300/009* (2013.01)

(58) Field of Classification Search
CPC ........ E03F 5/0404; E03F 5/046; E02D 17/20; E02D 31/06
USPC .............. 210/162, 163, 164, 170.03, 747.3; 405/302.6
See application file for complete search history.

(56) References Cited

U.S. PATENT DOCUMENTS

| | | | | |
|---|---|---|---|---|
| 5,405,539 | A | * | 4/1995 | Schneider ............ E03F 5/0404 210/163 |
| 6,086,758 | A | * | 7/2000 | Schilling ............... E03F 5/0404 210/164 |

(Continued)

*Primary Examiner* — Christopher Upton
(74) *Attorney, Agent, or Firm* — Roland J. Tong; Manning & Kass, Ellrod, Ramirez, Trester, LLP

(57) ABSTRACT

A storm water runoff and erosion control device includes a rigid frame covered by a layer of mesh material. The frame defines an interior space that is filled with filtration material. The device may be configured as a wattle having an elongated frame with a triangular cross-section. The wattle may be extended along the contour of a hill to reduce erosion, or it may be placed at the entrance to a drainage inlet to slow the velocity of, and filter sediment and contaminants from, water entering the inlet. Alternatively, the device may be a compact filter that is a cube, cylinder, sphere, or other suitable geometry. A plurality of these compact filters may be placed in the basin of a storm water drain, and piled sufficiently high to cover the outlet from the basin. Thus, all the water in the basin must pass through the compact filters before exiting.

16 Claims, 8 Drawing Sheets

Related U.S. Application Data

(60) Provisional application No. 62/556,054, filed on Sep. 8, 2017.

(51) Int. Cl.
    *C02F 103/00*     (2006.01)
    *C02F 101/20*     (2006.01)
    *C02F 101/32*     (2006.01)
    *C02F 101/30*     (2006.01)

(56) References Cited

U.S. PATENT DOCUMENTS

| | | | |
|---|---|---|---|
| 6,908,549 B2 * | 6/2005 | Middleton | E03F 5/0404 210/164 |
| 7,201,843 B2 * | 4/2007 | Sasaki | E03F 5/0404 210/164 |
| 7,549,820 B1 * | 6/2009 | Happel | E03F 5/0404 210/163 |
| 7,922,916 B1 * | 4/2011 | Witt | E03F 5/0404 210/747.3 |
| 8,221,632 B2 * | 7/2012 | McInnis | E03F 5/0404 210/747.3 |
| 9,562,350 B1 * | 2/2017 | Witt | E02D 31/06 |
| 2005/0067338 A1 * | 3/2005 | Page | E03F 5/0404 210/164 |
| 2009/0022552 A1 * | 1/2009 | Berenyi | E01F 7/025 405/302.6 |
| 2011/0024340 A1 * | 2/2011 | Horner | E03F 5/0404 210/170.03 |
| 2017/0051491 A1 * | 2/2017 | Wilkie | E03F 5/046 |

* cited by examiner

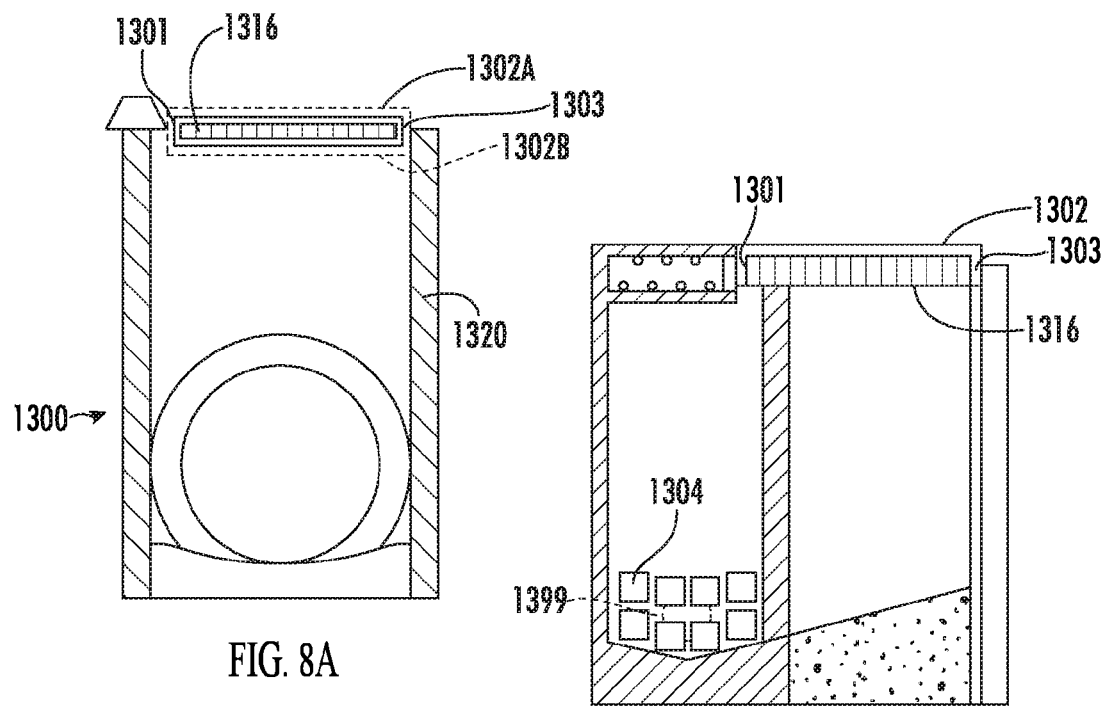
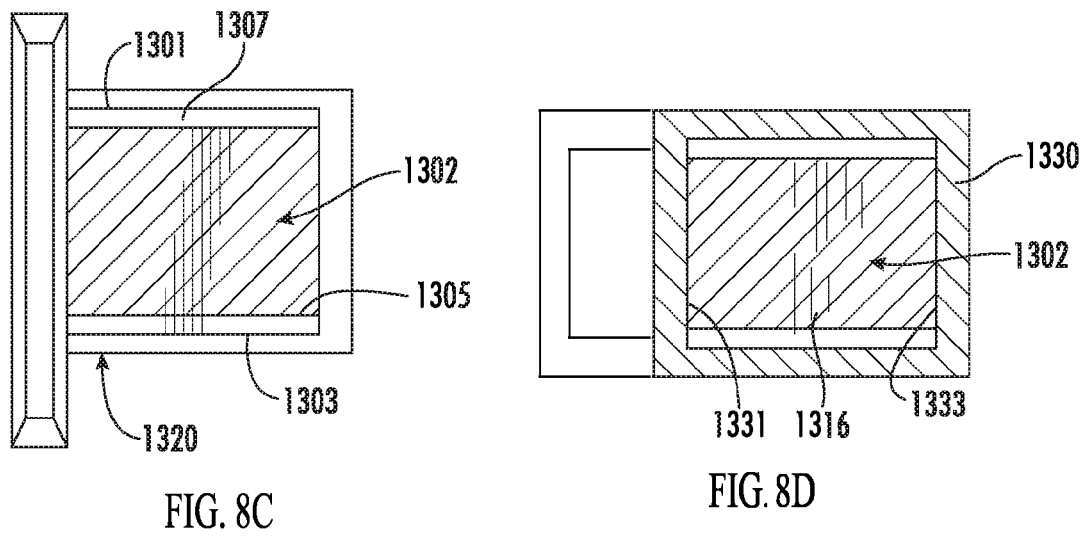
FIG. 8A
FIG. 8B
FIG. 8C
FIG. 8D

DEVICES FOR CONTROLLING EROSION AND STORM WATER RUNOFF

CROSS-REFERENCE TO RELATED TO APPLICATIONS

This application is a divisional of U.S. patent application Ser. No. 16/127,070, filed Sep. 15, 2018, which claims the benefit of U.S. Provisional Application No. 62/556,054 filed on Sep. 8, 2017.

TECHNICAL FIELD

The present disclosure relates in general to devices for controlling erosion and storm water runoff and, more particularly, to wattles and drain inlet filters.

BACKGROUND

Heavy rains present a multitude of challenges to environmentalists, civil engineers, builders, and farmers, among others. One of those challenges is soil erosion, which results in the loss of nutrient-rich topsoil, decreasing the fertility of the environment and destabilizing hillsides. Another challenge is storm water runoff, which picks up pollutants such as bacteria, oil and grease, trash, and pesticides, from paved surfaces and ultimately deposits these pollutants into local waterways. These challenges are not new—human beings have been trying to control erosion and storm water runoff for centuries—but climate change and overpopulation have made the need for solutions more urgent than ever.

In the construction industry, soil erosion and storm water runoff are often controlled through the use of fiber rolls or wattles—elongated tubes filled with straw, rice, coconut fiber, or the like, that are placed along the contours of hillsides or at drain inlets to intercept runoff and reduce the velocity of flow. Water passes through the tubes, but sediment is left behind, reducing the loss of topsoil, and preventing some contaminants from reaching the watershed. Alternatively, the same materials found in wattles can be woven into long, flat mats known as erosion control blankets, and spread out over large surfaces. Both wattles and erosion control blankets can be effective for short-term use, but the conventional filling materials deteriorate with time, making them unsuitable for permanent erosion control.

Storm water runoff is also controlled through a variety of Best Management Practices including the use of retaining walls, bioswales, concrete barriers, gross solids removal devices (GSRDs), filtering vaults, gabions, and drainage inlet filters. There is room for improvement in all these practices.

SUMMARY

Storm water runoff and erosion control devices according to the present disclosure comprise various configurations for positioning filtration material in the path of flowing surface water. In the most preferred configurations, the filtration material comprises biochar or activated carbon.

A storm water runoff and erosion control device comprises a rigid frame covered by a layer of mesh material. The frame, which may be constructed from a plurality of tubular elements such as polyvinylchloride (PVC) pipes, defines an interior space that is filled with filtration material. In one example, the device is configured as a wattle having an elongated frame with a triangular cross-section. The wattle may be extended along the contour of a hill to reduce erosion, or it may be placed at the entrance to a drainage inlet to slow the velocity of, and filter sediment and contaminants from, water entering the inlet. In another example, the device is a compact filter that may be configured as a cube, cylinder, sphere, or other suitable geometry. A plurality of these compact filters may be placed in the basin of a storm water drain, and piled sufficiently high to cover the outlet from the basin. Thus, all the water in the basin must pass through the compact filters before exiting.

BRIEF DESCRIPTION OF THE DRAWINGS

FIG. 8A is a side elevation of a catch basin fitted with stormwater runoff control devices according to the present disclosure.

FIG. 8B is a front elevation of FIG. 20A FIG. 20C is a front elevation of FIG. 20A.

FIG. 8C is a plan view of FIG. 20A.

FIG. 8D is a plan view of FIG. 20B.

DETAILED DESCRIPTION

Figure 1:
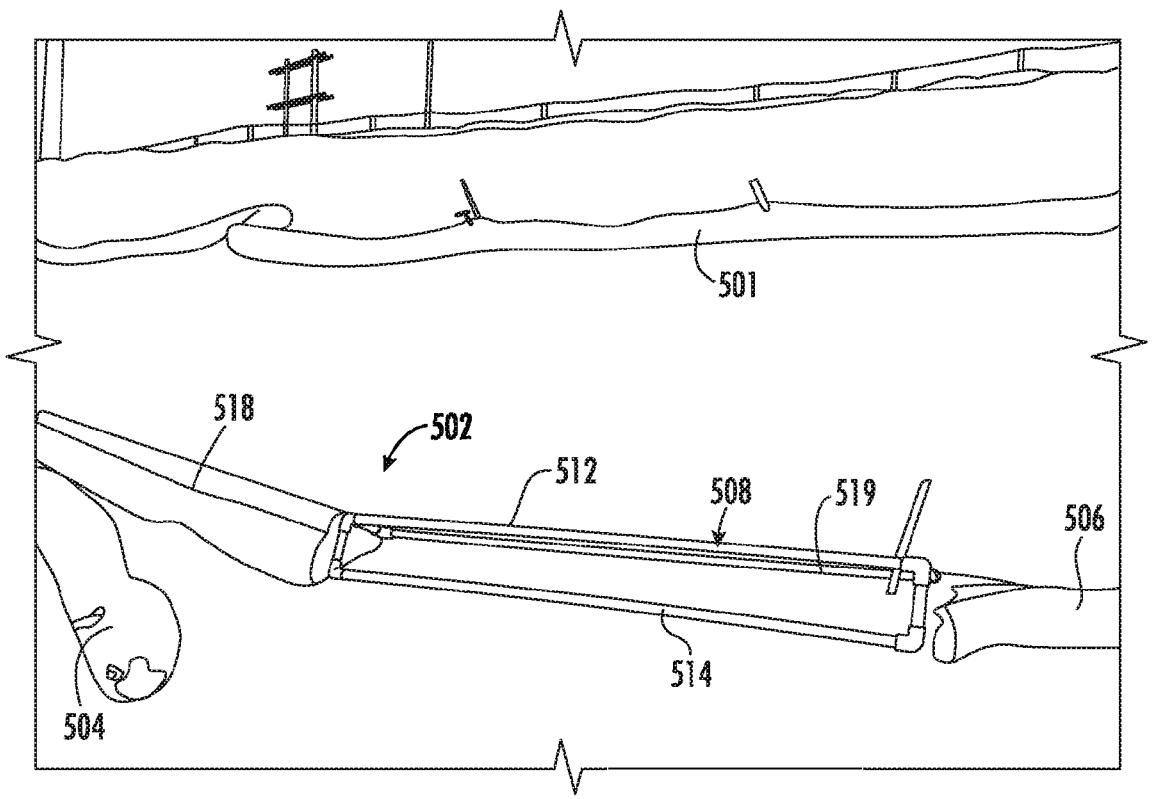
FIG. 1 is a perspective view of an erosion control wattle according to the present disclosure, with the frame separated from its mesh covering for purposes of illustration.
Figure 2:
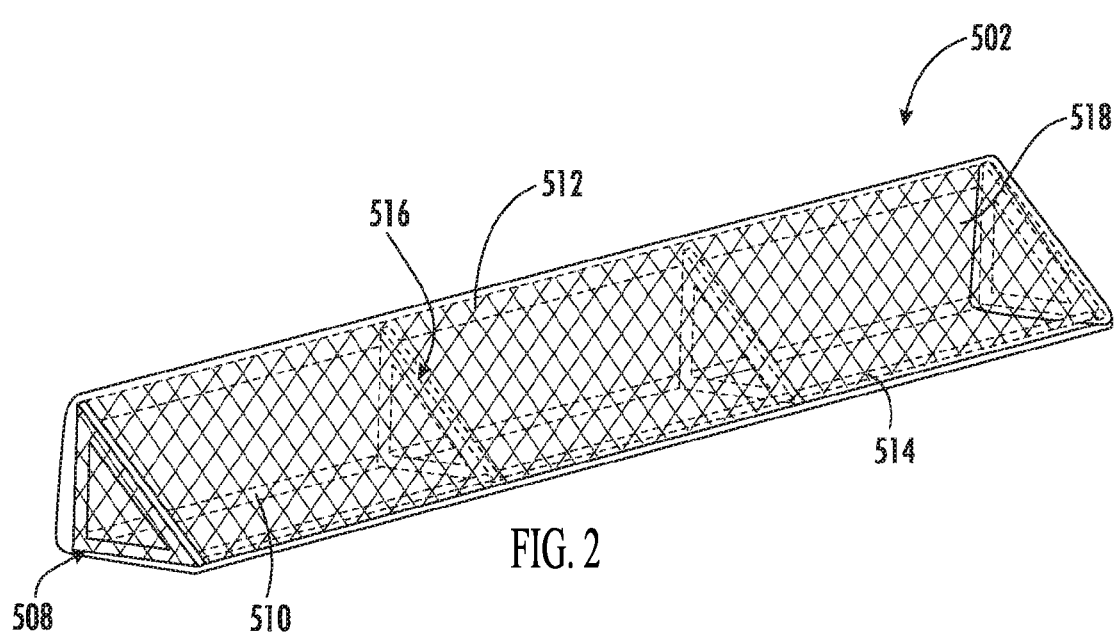
FIG. 2 is fragmentary perspective view of an erosion control wattle according to the present disclosure, with the inner frame shown in phantom.

FIG. 1 shows a hillside on which several conventional wattles 500 have been placed to slow down erosion. A triangular wattle 502 according to the present disclosure is being set up to replace a wattle that has deteriorated, leaving two halves 504, 506, with a large gap in between. The triangular wattle comprises a triangular frame 508 and a mesh covering 518, which has been separated from the frame 508 for purposes of illustration. The frame 508 is made of elongated tubular members 510, 512, 514, which may be made from a plastic material such as polyvinyl chloride (PVC), or from metal, or other suitable materials. As shown in FIG. 2, the triangular frame 508 is configured as a right triangle. If necessary, a plurality of triangular reinforcing members 516 may extend between the tubular members 510, 512, 514 at regular intervals along the length of the frame 508 to increase the strength and stability of the wattle 502. The triangular reinforcing members 516 may be constructed from tubes of the same material as the tubular members 510, 512, 514.

Figure 3A:
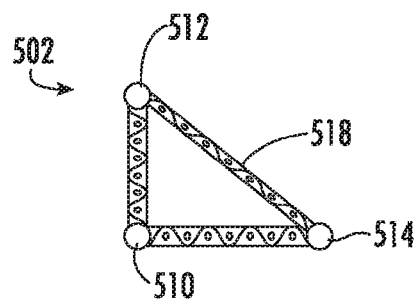
FIGS. 3A-D are sectional views taken through various examples of an erosion control wattle according to the present disclosure.
Figure 3B:
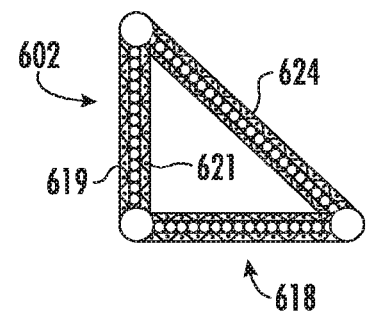
Figure 3C:
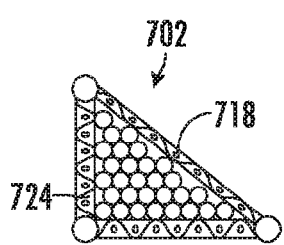
Figure 3D:
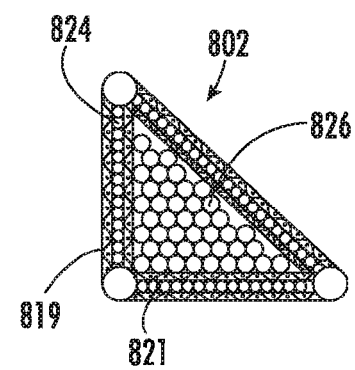

The mesh material 518 covering the frame 508 may be made of any woven or non-woven fabric capable of filtering out very fine particles, but is preferably a non-woven geotextile made of propylene fibers. Drain and filter geotextile fabrics suitable for this purpose are commercially available from Christy's Inc. of Anaheim, Calif. In one example, shown in FIG. 3A, the mesh material 518 comprises a single layer of woven or non-woven fabric, and the interior of the wattle 502 is empty. In another example, shown in FIG. 3B, the interior of the wattle 602 is again empty, but the mesh material 618 comprises two layers 619, 621 of woven or non-woven fabric, with a layer of filtration material such as biochar or activated carbon 624 between the fabric layers 619 and 621. In yet another example, shown in FIG. 3C, the mesh material 718 comprises a single layer of woven or non-woven fabric, and the interior of the wattle 702 is filled with filtration material such as biochar or activated carbon 724. In still another example, shown in FIG. 3D, the mesh material 818 comprises two layers 819, 821 of with a layer of woven or non-woven fabric, with a layer of filtration material such as biochar or activated carbon 824 between the fabric layers 819 and 821. The interior of the wattle 802 is filled with more filtration material 826.

Figure 4:
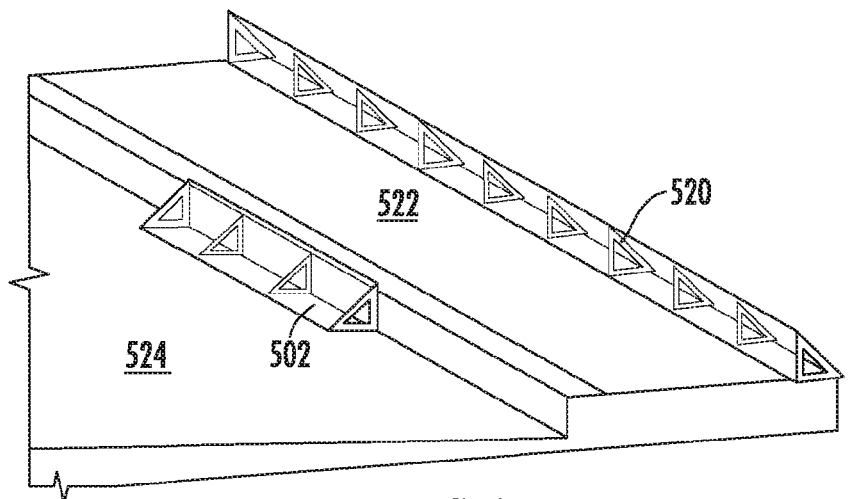
FIG. 4 is a perspective view showing erosion control wattles according to the present disclosure, placed along the edges of a curb or sidewalk.

FIG. 4 shows wattles 502, 520 according to the present disclosure being used to control runoff around a sidewalk 522. The first wattle 502 has been placed in front of a culvert in the sidewalk 522, with one short leg of the triangular frame resting against the edge of the sidewalk 522, the other short leg of the triangular frame resting against the street 524, and the hypotenuse of the triangular frame facing outwardly toward the street. Orienting the wattle 502 in this way ensures that the portion with the largest surface area faces the street, thus maximizing the amount of water that can be filtered before passing into the culvert.

The second wattle 520 is elongated (or alternatively, several wattles 520 may be placed end-to-end) to extend along substantially the full length of the sidewalk, and the orientation of this wattle is reversed relative to the first wattle 502, so that the hypotenuse of the triangular frame faces away from the street. This configuration is useful if the sidewalk is located next to a hill, since it slows or prevents water from running down the hill and onto the sidewalk.

Figure 5:
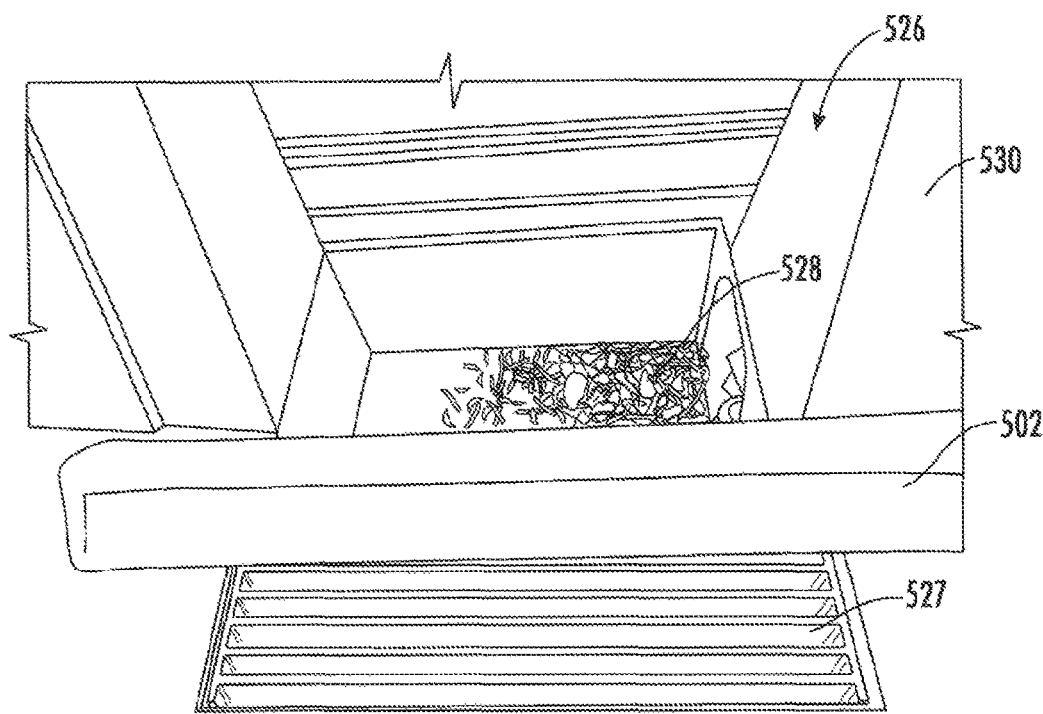
FIG. 5 is a perspective view showing a wattle according to the present disclosure, placed at the inlet of storm drain.

FIG. 5 shows a wattle 502 according to the present disclosure, placed between a storm drain 526 and a drainage basin 526 at the base of a concrete barrier 530. The purpose of the wattle 502 is to filter contaminants from any water that overflows from the drainage basin 526 before it enters the storm drain 526.

Figure 6:
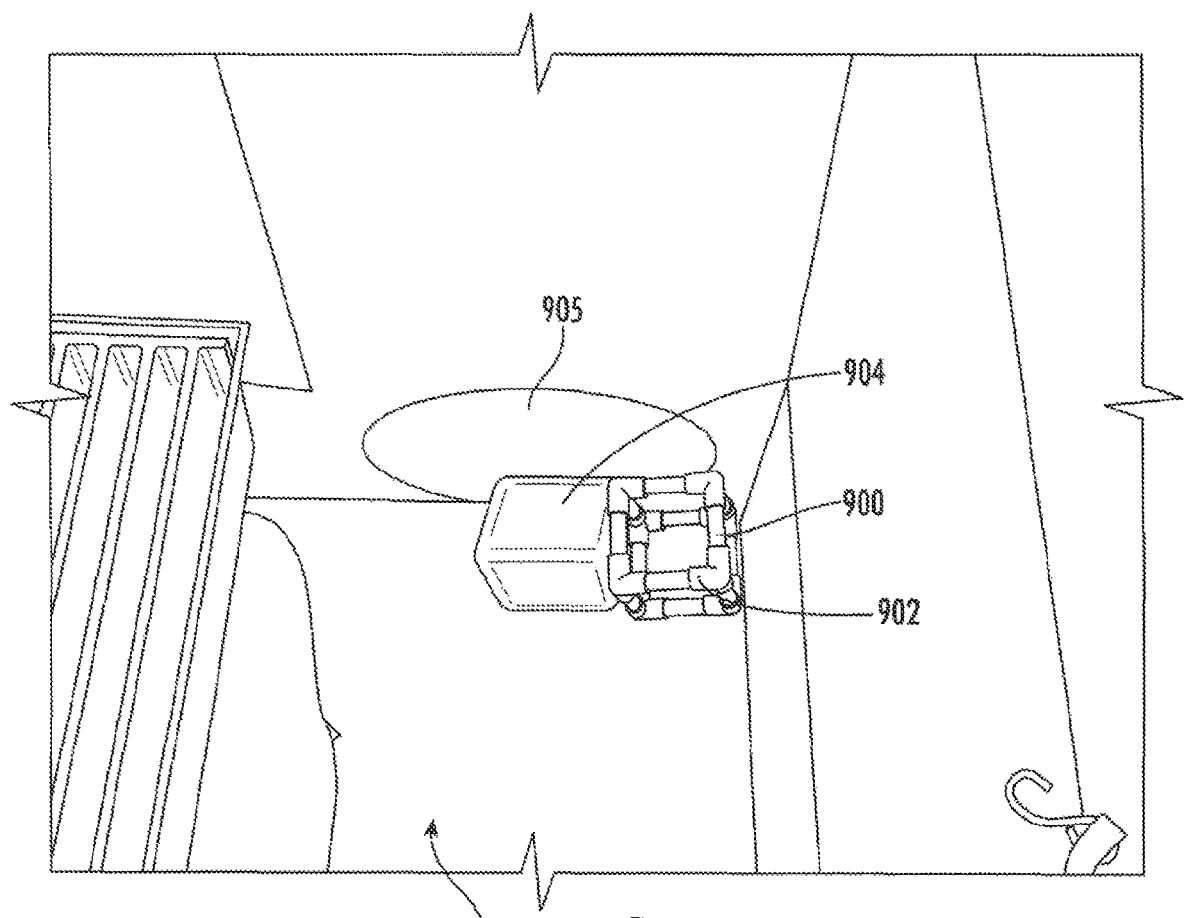
FIG. 6 is a perspective view showing a storm water runoff compact filter according to the present disclosure, placed at the bottom of a catch basin.
Figure 7A:
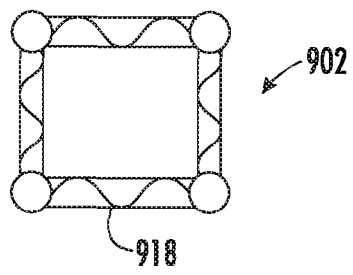
FIGS. 7A-D are sectional views of a various examples of a storm water runoff compact filter according to the present disclosure.
Figure 7B:
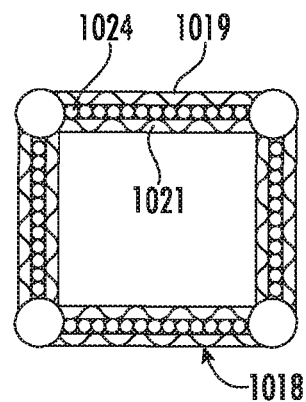
Figure 7C:
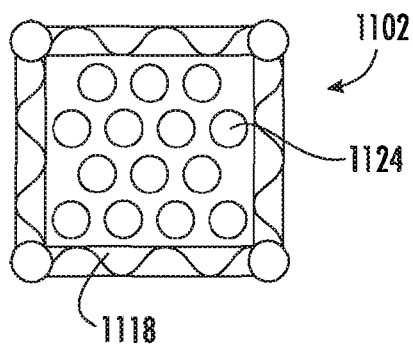
Figure 7D:
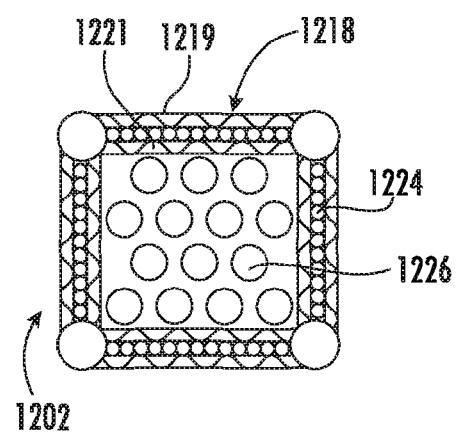

FIG. 6 shows a pair of compact drainage basin filters 900, 904 according to an alternate example of the present disclosure, positioned in front of the outlet 905 from a drainage basin 906. The mesh covering of one of the compact drainage filters 900 has been removed to show the frame 902. The compact drainage basin filters 900 are similar in structure to the wattles of FIGS. 1-5, except for their more compact size. In this illustrated example, the frame 902 is configured as a cube rather than an elongated triangle. In other examples, the frame may be triangular, spherical, cylindrical, hexagonal, or whatever compact geometric configuration is most suitable for a specific drainage basin. If the drainage outlet 905 is too large to be covered by a single compact drainage filter 900, several compact drainage filters 900 may be arranged side-by-side, or stacked upon each other, to filter contaminants from water passing out of the basin 906 through the outlet 905.

FIGS. 7A-D are cross-sectional views showing various examples of drainage basin cubes according to the present disclosure. In one example, shown in FIG. 7A, the mesh material 918 comprises a single layer of woven or non-woven fabric, and the interior of the cube 502 is empty. In another example, shown in FIG. 7B, the interior of the cube 1002 is again empty, but the mesh material 1018 comprises two layers 1019, 1021 of with a layer of woven or non-woven fabric, with a layer of filtration material such as biochar or activated carbon 1024 between the fabric layers 1019 and 621. In yet another example, shown in FIG. 7C, the mesh material 1118 comprises a single layer of woven or non-woven fabric, and the interior of the cube 1102 is filled with filtration material such as biochar or activated carbon 1124. In still another example, shown in FIG. 19D, the mesh material 1218 comprises two layers 1219, 1221 of with a layer of woven or non-woven fabric, with a layer of filtration material such as biochar or activated carbon 1224 between the fabric layers 1219 and 1221. The interior of the cube 1292 is filled with more filtration material 1226.

Figure 9A:
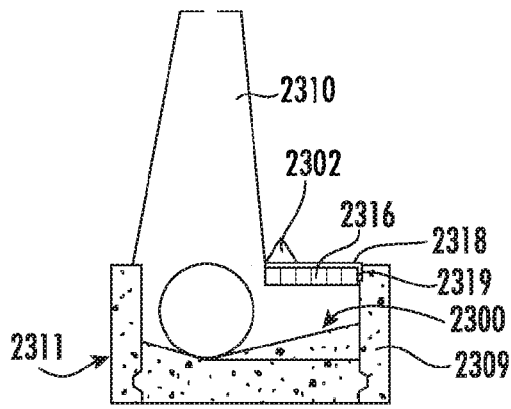
FIGS. 9A-E show various arrangements for using wattles, storm water runoff control carpets, and storm water control cubes according to the present disclosure to control flow in and out of a catch basin located below concrete barriers.
Figure 9B:
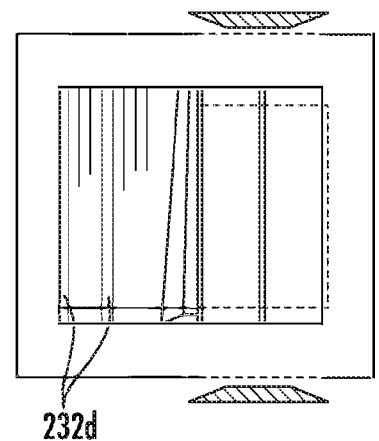
Figure 9C:
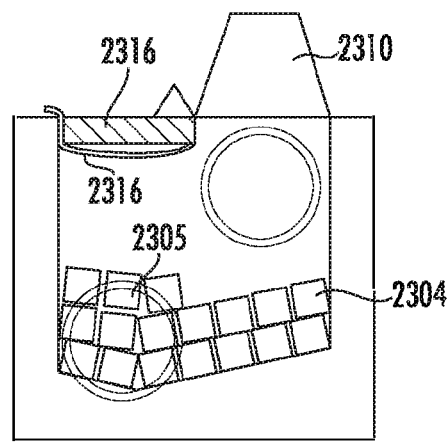

FIGS. 9A-C show a catch basin 2300 located beneath a concrete barrier 2310. A drainage grate 2316 positioned over the drainage inlet between one side of the barrier and one wall 2309 of the inlet frame 2311 prevents large debris from entering the catch basin 2300. A stormwater runoff control blanket 2318 is placed over the drainage grate 2316, and a storm water control wattle 2302 is wedged into an opening between the grate 2316 and the barrier 2310. The blanket is locked in place by clamping one edge 2319 between the edge of the grate 2316 and the wall 2309, as shown by in FIG. 23A, and by inserting elongated boards 2320 between the bars of the grate 2316, as shown in FIG. 2B. In an alternative arrangement, shown in FIG. 23C, the runoff control blanket 2318 is positioned under the drainage gate 316. In addition, a plurality of compact drainage filters, such as basin cubes 2304 are positioned in front of the drainage outlet 2305, to allow further removal of contaminants from water leaving the basin.

Figure 9D:
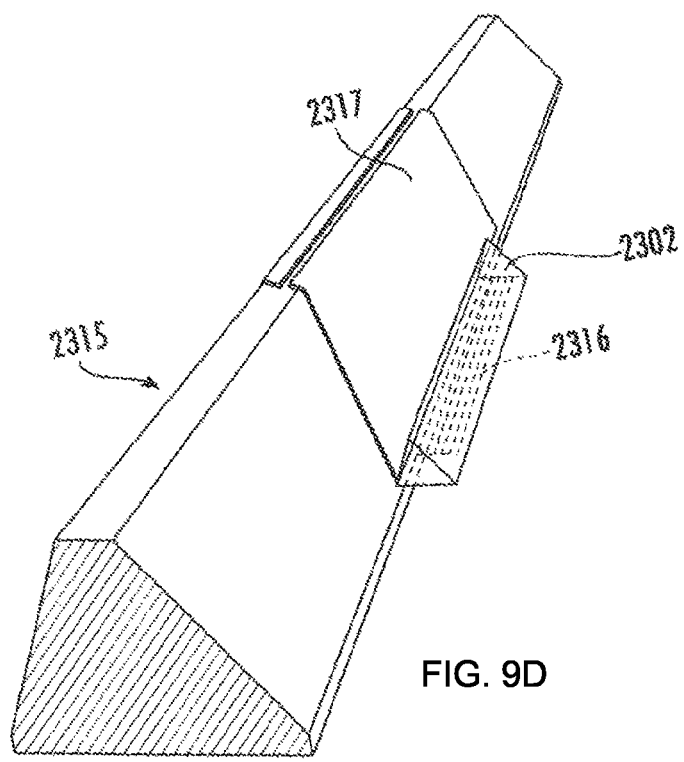

FIG. 9D shows a drainage basin underneath an elongated concrete barrier 2315, where a portion of the barrier 2315 directly above the drainage grate 2316 is covered by a steel plate 2317 that prevents erosion of the concrete. A wattle 2302 according to the present disclosure is wedged into the space between the bottom edge of the steel plate 2317 and the drainage grate 2316, to prevent debris and contaminants from entering the drainage inlet.

Figure 9E:
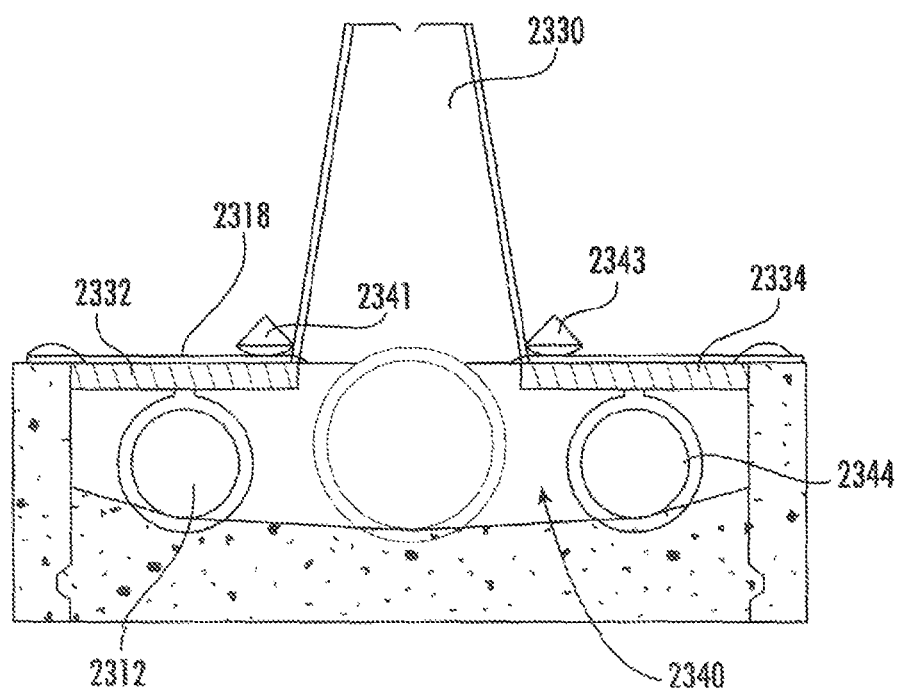

FIG. 9E shows a steel-plated concrete barrier 2330 located between two drainage grates 2332, 2334 over a catch basin 2340 containing slotted pipes 2342, 2344. Carpets 2318, 2319 over the 2332, 2334 remove debris and contaminants from storm water before it enters the catch basin 2340 and slotted pipes 2342, 2344. In addition, wattles 2341, 2343 are wedged into the spaces between the bottom edge of the steel-plated concrete barrier 2330 and the drainage grates 2332, 2334 to provide more filtration.

The above uses for the stormwater runoff and erosion control devices of the present disclosure are not intended to be limiting, but are just examples of the multitude of ways in which storm water control carpets or blankets, wattles (also called dimensional tubes), and compact drainage filters according to the present disclosure may be used in combination with retaining walls, bioswales, concrete barriers, gross solids removal devices (GSRDs), filtering vaults, gabions, drainage inlet filters, and other Best Management Practices to prevent erosion and minimize contamination of watersheds due to stormwater runoff.

While exemplary examples are described above, it is not intended that these examples describe all possible forms of the invention. Rather, the words used in the specification are words of description rather than limitation, and it is understood that various changes may be made without departing from the spirit and scope of the invention. Additionally, the features of various implementing examples may be combined to form further examples of the invention.

What is claimed is:

1. A storm water runoff control device comprising;
a rigid frame including a plurality of frame elements defining a closed, three-dimensional shape having an interior surrounded by a plurality of planar faces; and
a mesh material covering all the planar faces of the three-dimensional shape defined by the frame and configured to prevent sediment from entering the interior space from any direction.

2. The storm water runoff control device according to claim 1, wherein the rigid frame is constructed from a plurality of tubular elements.

3. The storm water runoff control device according to claim 2, wherein the tubular elements are formed of polyvinylchoride.

4. The storm water runoff control device according to claim 1, wherein the rigid frame is triangular in crosssection.

5. The storm water runoff control device according to claim 1, further comprising a filtration material filling the interior space.

6. The storm water runoff control device according to claim 5, wherein the filtration material is a biomass material.

7. The storm water runoff control device according to claim 6, wherein the biomass material comprises charcoal.

8. The storm water runoff control device according to claim 7, wherein the charcoal comprises biochar.

9. The storm water runoff control device according to claim 8, wherein the biomass material comprises activated carbon.

10. The storm water runoff control device according to claim 5, wherein the interior space is filled with loose filtration material.

11. The storm water runoff control device according to claim 1, wherein the mesh material comprises a layer of fabric.

12. The storm water runoff control device according to claim 11, wherein the mesh material comprises two layers of fabric, with a layer of filtration material between the two layers of fabric.

13. The storm water runoff control device according to claim 1, wherein the interior space is surrounded by at least five planar surfaces.

14. The storm water runoff control device according to claim 1, wherein the frame is cubic.

15. The storm water runoff control device according to claim 1, wherein the frame includes:
a set of elongated elements extending in a longitudinal direction;
two sets of end elements extending perpendicular to the elongated elements and defining opposite ends of the frame; and
a reinforcement member located between the opposite ends of the frame and configured to increase the strength and stability of the device.

16. The storm water runoff control device according to claim 1, wherein the reinforcement member extends perpendicular to the elongated elements.

* * * * *